US008041800B2

United States Patent
Gilfix et al.

(10) Patent No.: US 8,041,800 B2
(45) Date of Patent: Oct. 18, 2011

(54) AUTOMATIC ORCHESTRATION OF DYNAMIC MULTIPLE PARTY, MULTIPLE MEDIA COMMUNICATIONS

(75) Inventors: Michael A. Gilfix, Austin, TX (US); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 11/269,189

(22) Filed: Nov. 8, 2005

(65) Prior Publication Data

US 2007/0106795 A1    May 10, 2007

(51) Int. Cl.
*G06F 15/173* (2006.01)
*H04M 11/00* (2006.01)
*H04B 1/06* (2006.01)

(52) U.S. Cl. ............ 709/223; 379/88.13; 455/26.1
(58) Field of Classification Search .......... 709/204, 709/223; 370/260, 352, 389; 455/74.1, 26.1; 379/88.13

See application file for complete search history.

(56) References Cited

U.S. PATENT DOCUMENTS

| | | | |
|---|---|---|---|
| 5,388,258 A * | 2/1995 | Larsson et al. ......... 455/26.1 |
| 5,598,535 A * | 1/1997 | Brech et al. ......... 709/230 |
| 6,011,841 A | 1/2000 | Isono |
| 6,233,332 B1 | 5/2001 | Anderson et al. |
| 6,304,648 B1 * | 10/2001 | Chang ......... 379/202.01 |
| 6,690,654 B2 * | 2/2004 | Elliott et al. ......... 370/260 |
| 6,771,765 B1 | 8/2004 | Crowther et al. |
| 6,876,734 B1 * | 4/2005 | Summers et al. ....... 379/202.01 |
| 6,988,126 B2 * | 1/2006 | Wilcock et al. ......... 709/204 |
| 7,046,778 B2 * | 5/2006 | Martin et al. ......... 379/201.01 |
| 7,209,916 B1 * | 4/2007 | Seshadri et al. ......... 1/1 |
| 7,334,017 B2 * | 2/2008 | Hawkes et al. ......... 709/205 |
| 7,417,988 B1 * | 8/2008 | Tripathi et al. ......... 370/389 |
| 7,650,597 B2 * | 1/2010 | Bohlmann et al. ......... 717/136 |
| 2001/0024497 A1 | 9/2001 | Campbell et al. |
| 2002/0055974 A1 * | 5/2002 | Hawkes et al. ......... 709/204 |
| 2002/0073150 A1 * | 6/2002 | Wilcock ......... 709/204 |
| 2002/0073208 A1 * | 6/2002 | Wilcock et al. ......... 709/227 |
| 2002/0087649 A1 * | 7/2002 | Horvitz ......... 709/207 |
| 2002/0198719 A1 * | 12/2002 | Gergic et al. ......... 704/270.1 |
| 2003/0014488 A1 * | 1/2003 | Dalal et al. ......... 709/204 |
| 2003/0135552 A1 * | 7/2003 | Blackstock et al. ......... 709/205 |
| 2003/0223381 A1 * | 12/2003 | Schroderus ......... 370/285 |
| 2004/0003046 A1 * | 1/2004 | Grabelsky et al. ......... 709/206 |
| 2004/0049545 A1 * | 3/2004 | Wayne Lockridge et al. ......... 709/206 |

(Continued)

OTHER PUBLICATIONS

Rosenberg et al, SIP: Session Initiation Protocol, Oct. 26, 2001, Internet Engineering Task Force, Internet Draft.*

(Continued)

*Primary Examiner* — Firmin Backer
*Assistant Examiner* — Micheal A Chambers
(74) *Attorney, Agent, or Firm* — Lee & Associates, P.C.; David A. Mims, Jr.

(57) ABSTRACT

A communication orchestration service automatically orchestrates dynamic multiple party, multiple media communications. A customer expresses his or her communications needs in the form of a high-level goal or goals. A goal-based search finds a combination of building block predicates that can be used to satisfy the customer's needs. In conjunction with the search process, the mechanism uses the SIP OPTIONS request or presence information to actively query device status and capabilities during the search. This enables the search to actively explore the communications environment at runtime. Once a solution is found, the necessary parties can be contacted, resources can be provisioned, and the multiple media, multiple user collaboration/conference can be initiated.

20 Claims, 5 Drawing Sheets

U.S. PATENT DOCUMENTS

| | | | |
|---|---|---|---|
| 2004/0072544 A1* | 4/2004 | Alexis | 455/74.1 |
| 2004/0114541 A1* | 6/2004 | Caspi et al. | 370/260 |
| 2004/0117404 A1 | 6/2004 | Crivella et al. | |
| 2004/0196856 A1 | 10/2004 | Bondarenko et al. | |
| 2004/0249884 A1* | 12/2004 | Caspi et al. | 709/204 |
| 2004/0267939 A1* | 12/2004 | Yumoto et al. | 709/227 |
| 2005/0136952 A1* | 6/2005 | Zabawskyj et al. | 455/466 |
| 2005/0163289 A1* | 7/2005 | Caspi et al. | 379/88.13 |
| 2006/0031339 A1* | 2/2006 | Peters | 709/206 |
| 2006/0080432 A1* | 4/2006 | Spataro et al. | 709/224 |
| 2006/0146792 A1* | 7/2006 | Ramachandran et al. | 370/352 |
| 2006/0173936 A1* | 8/2006 | Castro et al. | 707/205 |
| 2006/0256751 A1* | 11/2006 | Jagadeesan et al. | 370/331 |
| 2006/0294112 A1* | 12/2006 | Mandato et al. | 707/100 |
| 2007/0094374 A1* | 4/2007 | Karia et al. | 709/223 |
| 2007/0123259 A1* | 5/2007 | Huang et al. | 455/436 |
| 2007/0160031 A1* | 7/2007 | Sylvain | 370/352 |
| 2007/0291734 A1* | 12/2007 | Bhatia et al. | 370/352 |
| 2008/0310397 A1* | 12/2008 | Hu et al. | 370/352 |

OTHER PUBLICATIONS

Jayanth Mysore et al, The Liquid Media System—a Multi-Device Streaming Media Orchestration Framework, Apr. 6, 2004, Motorola Labs.*

Rosenberg et al, SIP: Session Initiation Protocol, Oct. 26, 2001, Internet Engineering Task Force, Internet Draft.*

Jayanth Mysore et al, The Liquid Media System—a Multi-Device Streaming Media Orchestration Framework, Apr. 6, 2004, Motorola Labs.*

* cited by examiner

AUTOMATIC ORCHESTRATION OF DYNAMIC MULTIPLE PARTY, MULTIPLE MEDIA COMMUNICATIONS

BACKGROUND OF THE INVENTION

1. Field of the Invention

The present invention relates generally to Internet telephony and, in particular, to automatic orchestration of dynamic multiple party, multiple media communications.

2. Description of the Related Art

Telephone companies are investing in, creating, and deploying voice over Internet Protocol (VoIP) infrastructure. Session initiation protocol (SIP) has emerged as the open, de facto standard for inter-device signaling and provides a means for initiating and tearing down media sessions between two endpoints, as well as negotiating the media types supported by the two endpoints. SIP also allows for mid-call changes to the media sessions, as well as the network location of the media packet sources and sinks.

Because of the expected jump in the number of SIP-enabled, the increased functionality offered by SIP devices, as compared to traditional public switch telephone network (PSTN) lines, and the blur in traditional communications media offered by technologies such as video conferencing, speech-to-text, text-to-speech, etc., the VoIP landscape is rapidly growing in both size and complexity.

As opposed to carrying circuit services on top of the Internet protocol (IP), the IP Multimedia Subsystem (IMS) offers operators the opportunity to build an open IP based service infrastructure that will enable an easy deployment of new rich multimedia communication services mixing telecom and data services. Alcatel® IMS solution is based on 3GPP specifications but is also able to provide common IMS services for mobile and other access networks including fixed ones. Before trying to emulate circuit switched domain, IMS first provides new services that are not too demanding for the underlying access network.

While single media collaboration, such as voice conferencing or group instant messaging (IM) chat, can be done on the fly, orchestrating multiple media collaboration among a dynamic set of participants remains largely unsolved, other than by manual, brute-force methods. For example, if a user wishes to have a voice conference with two or more other participants, then a simple single-media session may be initiated. However, if the participants have different media capabilities, then orchestrating the session requires the initiator to coordinate multiple "legs" for the session. For instance, one participant may have voice capabilities while a second participant may have text-only capabilities. The initiator must then set up text-to-voice and voice-to-text conversion for the text-only device to participate in the session. All of these disparate services must be set up and coordinated in order for the session to take place.

SUMMARY OF THE INVENTION

The present invention recognizes the disadvantages of the prior art and provides a mechanism for automatic orchestration of dynamic multiple party, multiple media communications in a communications network. A goal-based search engine receives a goal for a communications session and performs a goal-based search to identify a set of discrete operations to achieve the goal. A connection manager determines whether resources are available for the set of discrete operations. When all resources are available for the set of discrete operations, the connection manager executes the set of discrete operations to initiate the communications session.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
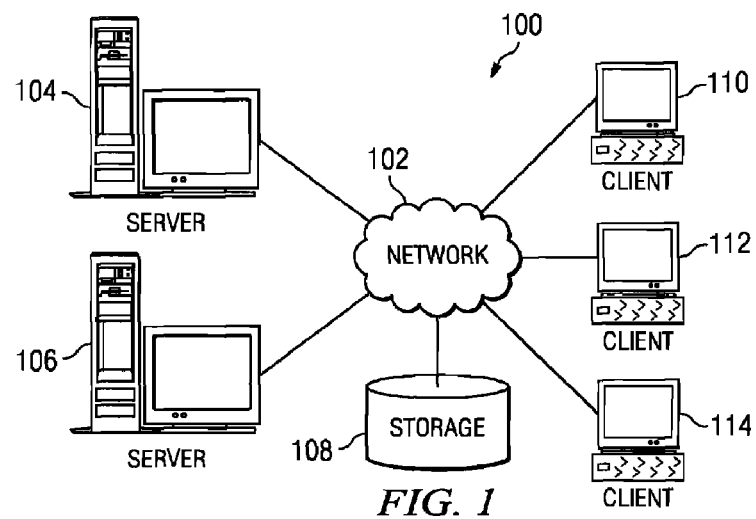
FIG. 1 depicts a pictorial representation of a network of data processing systems in which aspects of the present invention may be implemented.
Figure 2:
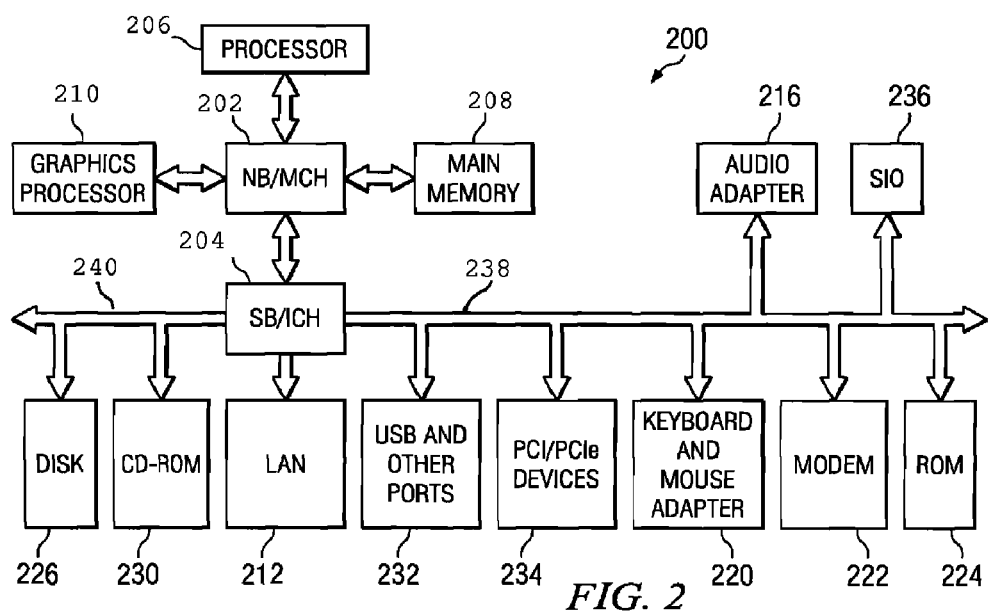
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In accordance with exemplary aspects of the present invention, clients 110, 112, 114 may be devices participating in Internet telephony or, more particularly, SIP-based telephony. An IP Multimedia Subsystem (IMS) may use SIP to establish IP connections between terminals. The IP connection can then be used to carry any IP traffic, for example interactive game sessions or push-to-talk communication. In SIP-based communication, devices have different media capabilities. For example, clients 110 and 112 may have voice capabilities, while client 114 may have text-only capabilities. Other devices (not shown) may have video or application sharing capabilities, for example.

SIP is a protocol for initiating and tearing down sessions between two endpoints. A SIP OPTIONS request allows one party's device to query another about its capabilities without alerting or "ringing" the second party. The OPTIONS request is handled as, "if one device hypothetically called another, how would the second respond" In addition to or in place of an OPTIONS request, presence information may also be used to determine information about the devices. For example, presence information may identify a terminal as being online with a given set of capabilities. The SIP REGISTER request allows a user to add or remove a device from the list of devices at which he or she can be reached.

Session description protocol (SDP) describes the media types supported by a device. SDP is used for negotiation of supported media types and network parameters for data exchange between two SIP-enabled devices. SIP for instant messaging and presence leveraging extensions (SIMPLE) is a way to convey both presence (on-line vs. off-line status) and to send and receive instant messages to/from SIMPLE-enabled SIP devices. IMS, as described above, is an example of another mechanism for negotiation of supported media types and network parameters for data exchange.

In the above example, client 110 may register voice capabilities with the REGISTER request, and client 112 may query the capabilities of client 110 using the OPTIONS request. Client 110 and client 112 may then use SIP to initiate and maintain a media session. This session may use a voice conferencing service, for example. Such a service may be embodied on a server, such as server 106, for example. While the above example includes two participating devices, voice conferencing will typically have three or more endpoints in a given session.

Various vendors provide SIP-based servers and applications for performing single-media dynamic conferencing. Simple examples are VoIP-based telephone conferencing and multi-user text chat sessions. A more complicated example may be video-inclusive technology like shared desktop collaboration. Voice-based technologies like interactive voice response (IVR), voice extensible markup language (VXML), text-to-speech and speech-to-text technology, and related servers may also be provided for media collaboration or processing.

Java™-based SIP applications may be developed and deployed onto SIP application servers using a servlet model. SIP servlets are similar to hypertext transport protocol (HTTP) servlets, but define different "do {Action}" style methods corresponding to messages in SIP. For example, an OPTION request would be processed by a "doOptions" method. A SIP application may comprise one or more SIP servlets bundled with an appropriate deployment descriptor indicating the SIP servlets that should be invoked to handle specific SIP message types. More information about SIP servlet application programming interface (API) may be found in Java™ Specifications Request (JSR) 116.

While SIP-based telephony is well established for end-point-to-endpoint sessions, a session among multiple participants with multiple media types is difficult to orchestrate. For example, in the example mentioned above, client 110 may have voice and text capabilities, client 112 may have only voice capabilities, and client 114 may have only text capabilities. Thus, several media types must be coordinated in order to establish a communication session among clients 110, 112, and 114.

In accordance with exemplary aspects of the present invention, a communication orchestration mechanism reduces the complexity associated with orchestrating dynamic multiple user, multiple media communications and collaborations. The mechanism maps small, discrete SIP communications paradigms into a set of building block logic predicates. A customer expresses his or her communications needs in the form of a high-level goal or goals. A goal-based search finds a combination of building block predicates that can be used to satisfy the customer's needs. The search process takes into account the necessary conversions between media types by using available services. The communication orchestration mechanism may be embodied as a service running on server 106, for example.

In conjunction with the search process, the mechanism uses the SIP OPTIONS request to actively query device status and capabilities during the search. As stated above, IMS may be used to establish IP connections between terminals and to query device status and capabilities. This enables the search to actively explore the communications environment at runtime. The entire search process may run on a hypothetical what-if level. Once a solution has been found, the necessary parties can be contacted, resources can be provisioned, and the multiple media, multiple user collaboration/conference can be initiated.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202.

Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
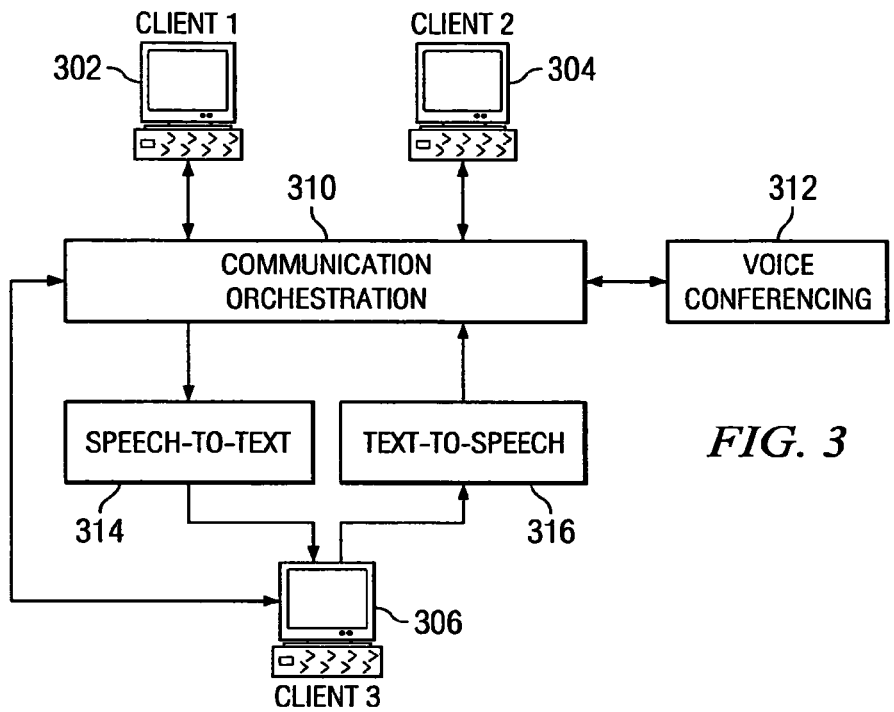
FIG. 3 illustrates an example communications environment with automatic orchestration of dynamic multiple party, multiple media communications in accordance with exemplary aspects of the present invention.

FIG. 3 illustrates an example communications environment with automatic orchestration of dynamic multiple party, multiple media communications in accordance with exemplary aspects of the present invention. Client 1 302 attempts to establish a communication session with client 2 304 and client 3 306. The user at client 1 302 sends a goal to communication orchestration service 310. Communication orchestration service 310 may be an application running on a server, for instance.

An example may be that a user, Frank, at client 1 302 needs to talk to Bob at client 2 304 and Jim at client 3 306. Bob is free right now, but Jim is in a meeting or is in a call already and can only communicate via text-based instant messaging. Frank and Bob are capable of participating in a voice call due to the capabilities of client 1 302 and client 2 304.

Communication orchestration service 310 makes SIP OPTIONS requests to client 1 302, client 2 304, and client 3 306 and determines that Jim is unavailable by phone, but is available by instant messaging. Based on the results of the OPTIONS request, communication orchestration service 310 determines that Frank and Bob can talk. Communication orchestration service 310 searches for solutions to the submitted goal. Based on the results of the search, communication orchestration service 310 provisions voice conferencing service 312 for voice communications and provisions speech-to-text service 314 and text-to-speech service 316, which are necessary to link Jim's instant messaging capabilities of client 3 306 into Frank and Bob's voice call.

Subsequent dynamic changes to the conference, such as network failure, individuals entering or leaving the call, an individual's media capabilities changing, and the like, cause communication orchestration service 310 to restart searching for solutions to the goal. This time, however, instead of starting with a "how do I accomplish this collaboration?" goal, the dynamic change causes communication orchestration service 310 to use a "how do I convert this collaboration into my desired collaboration?" goal.

Call goals that cannot be immediately accomplished can be delayed until later via the OPTIONS request, SIMPLE presence, and SIP device REGISTER request listening. A goal such as "I need to get both Bob and Jim on the phone at the same time" may be impossible if Jim is only available by chat, but can be reawakened if Jim REGISTERs a SIP-enabled voice-capable device. Similar events can be imagined as a user's on-line or off-line status changes, or as a user hangs up a SIP-enabled phone and is no longer busy. Goals may have an expiration. For example, a goal of "I need to talk to someone today" would expire when the current day ends.

In one illustrative embodiment, communication orchestration service 310 may use a framework of session initiation protocol (SIP) application design, development, and execution. Communication orchestration service 310 may partition SIP applications into modular components, and a framework for assembling and managing execution of these components. The framework models SIP applications as state machines, which receive an input markup language model that describes various states of the application and application execution flows that occur during state changes. In the context of the present invention, a SIP application may be implemented using JSR 116 specification, which is a SIP servlet application programming interface (API) specification based on the model of the existing Servlet API, available from Sun Microsystems, Inc.

The framework not only manages execution flows of SIP applications, but also stores and retrieves global application states on behalf of the SIP applications. The framework also determines which module components should receive flow control. This enables greater re-use of application components and reduces application complexity.

The framework includes four major components that are specific to each application: application data, precondition handlers, transition handlers, and postcondition handlers. Application data comprises an object that holds global application state and data that is required throughout the lifetime of the application. Application data is also passed to various components to provide a common data container. When messages are received, application data parses the body of the messages and stores the data in an internal format for use by subsequent components.

Precondition handlers examine the application data object to determine if specific preconditions are met. Preconditions represent the state of the application data prior to a state transition. By examining the preconditions, the framework may determine the next state transition to be taken when processing an incoming message in a given state.

Transition handlers are modular or 'mini' SIP applications that contain logic for handling one aspect of the SIP application. Transition handlers receive and process SIP messages and store information in their own instance variables. The scope of the transition handlers is defined by the application developers. Transition handlers may be chained together to construct a state transition for a SIP application. Flow controls between transition handlers may be handled by a framework controller. Loosely grained, robust, general transition handlers may facilitate transition handler reuse.

Post condition handlers examine the application data object to determine if specific post conditions are met. Post conditions represent the state of the application data after a state transition. By examining the post conditions, the framework may determine if a state transition is successful.

The framework controller manages execution flows of the SIP application throughout its lifecycle. The framework controller takes an input markup language that describes information, including the application data object, flow of the application, and a list of state transitions in the application. The input markup language model may be an extensible markup language (XML) deployment descriptor that is deployed for a particular SIP application.

An application data object includes data that is specific to the application. The flow of application includes various states of the application and futures states that are accessible by each state. Thus, the flow of the application is in a state machine format. In the list of state transitions, each state transition includes necessary precondition handlers, necessary post condition handlers, and a list of transition handlers to be executed for the state transition.

Figure 4A:
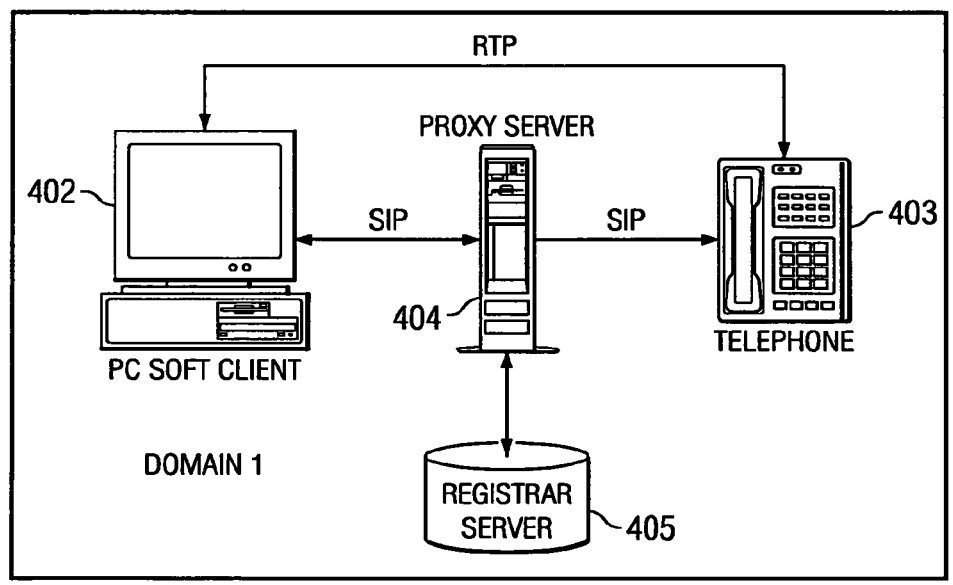
FIG. 4A is a diagram illustrating interactions between SIP users within the same domain in accordance with exemplary aspects of the present invention.

Turning now to FIG. 4A, a diagram illustrating interactions between SIP users within the same domain is depicted in accordance with a preferred embodiment of the present invention. As depicted in FIG. 4A, domain 1 includes two users, PC soft client 402 and telephone 403. PC soft client 402 may be implemented as a data processing system, such as data processing system 200 in FIG. 2.

Upon power up, both PC soft client 402 and telephone 403 register their availability and their IP addresses with SIP proxy server 404 in domain 1. When a user of PC soft client 402 initiates a request to communicate with a user of telephone 403, PC soft client 402 notifies proxy server 404 using the session initiation protocol. Proxy server 404 in turn asks for and receives the IP address of telephone 403 from registrar server 405.

Proxy server 404 then relays the invitation to communicate from PC soft client 402, including its media type, to telephone 403. The user of telephone 403 informs proxy server 404 whether the invitation is accepted and if the user is ready to receive messages. If the invitation is accepted, the acceptance is communicated by proxy server 404 back to a user of PC soft client 402. Thus, a SIP session is established. Hereafter, subsequent messages may be sent directly between PC soft client 402 and telephone 403 without interference by proxy server 404.

Figure 4B:
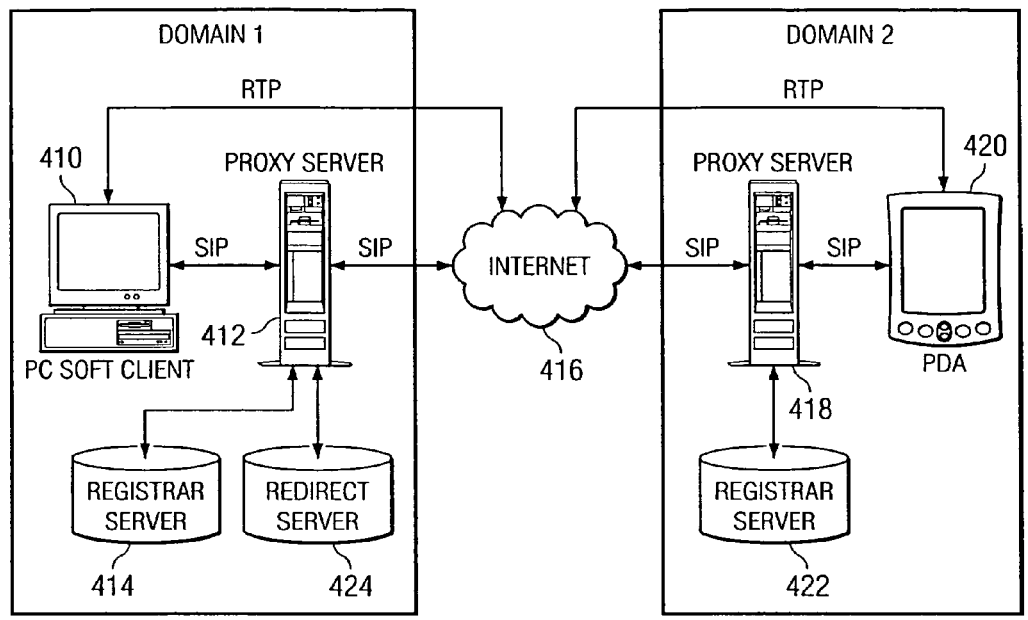
FIG. 4B is a diagram illustrating interactions between SIP users of different domains in accordance with exemplary aspects of the present invention.

Turning now to FIG. 4B, a diagram illustrating interactions between SIP users of different domains is depicted in accordance with a preferred embodiment of the present invention. As depicted in FIG. 4B, a user of PC soft client 410 initiates a request to communicate with a user of personal digital assistant (PDA) 420. However, instead of domain 1, PDA 420 belongs to a different domain, domain 2.

In this case, when proxy server 412 receives the communication request from PC soft client 410, proxy server 412 recognizes that PDA 420 is in domain 2 and queries redirect server 424 for the IP address of PDA 420. Redirect server 424 may reside in either domain 1 or domain 2. Redirect server 424 then provides the IP address of PDA 420 to proxy server 412. Upon receiving the IP address, proxy server 412 forwards the SIP session invitation, via Internet 416, to proxy server 418 in domain 2, which forwards the invitation to a user of PDA 420. In turn, the user of PDA 420 may accept the invitation and proxy server 418 sends the acceptance back to the user of PC soft client 410.

Figure 5:
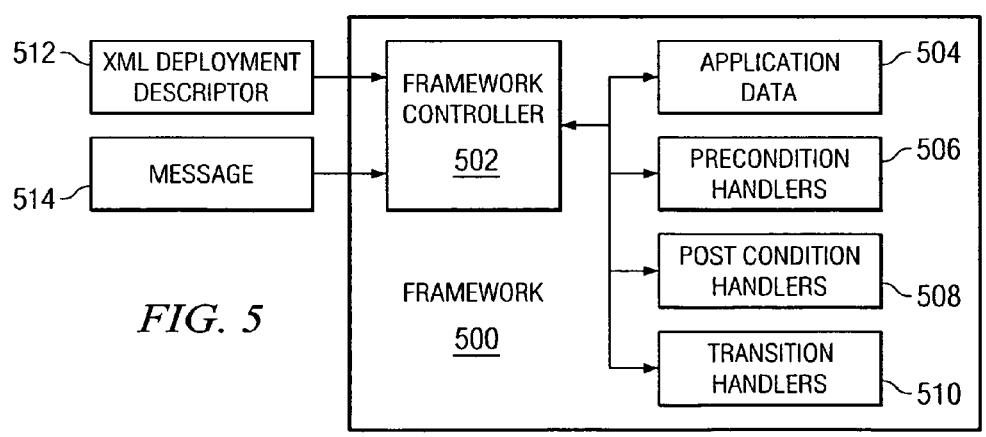
FIG. 5 is a diagram of component interactions for a framework of SIP application design, development, and execution in accordance with exemplary aspects of the present invention.

Turning now to FIG. 5, a diagram of component interactions for a framework of SIP application design, development, and execution is depicted in accordance with a exemplary aspects of the present invention. As depicted in FIG. 5, framework 500 includes framework controller 502, application data 504, precondition handlers 506, post condition handlers 508 and transition handlers 510.

When a SIP application is deployed to a user environment, a deployment description, such as XML deployment descriptor 512, is also deployed to configure the SIP application for execution. XML deployment descriptor 512 describes information about the SIP application, including data specific to the application, the flow of the application, and a list of transitions in the application.

When a user sends request message 514 via the SIP application to another user, framework controller 502 uses XML deployment descriptor 512 as an input to framework 500. Framework controller 502 then parses message 514 and updates application data 504 with message contents. Framework controller 502 then retrieves a state of the application from application data 504 and determines if the application is at the start of a state.

If the application is at a start of a state, framework controller 502 evaluates preconditions by examining application data 504 to determine which state transition to take. If no precondition is defined, framework controller 502 proxies the message to the next transition handler 510 for the state transition. If preconditions are defined, framework controller 502 loads the next set of precondition handlers 506 to determine if specific preconditions are met.

After each precondition handler 506 determines that preconditions are met, framework controller 502 invokes methods of each transition handler 510 according to XML deployment descriptor 512 and passes in message 514 and application data object 504 as input arguments. Each transition handler 510 then updates the result of the state of the application, which includes evaluating post conditions using post condition handlers 508. Thus, using framework 500, a user may keep track of all states on behalf of the SIP application.

Figure 6:
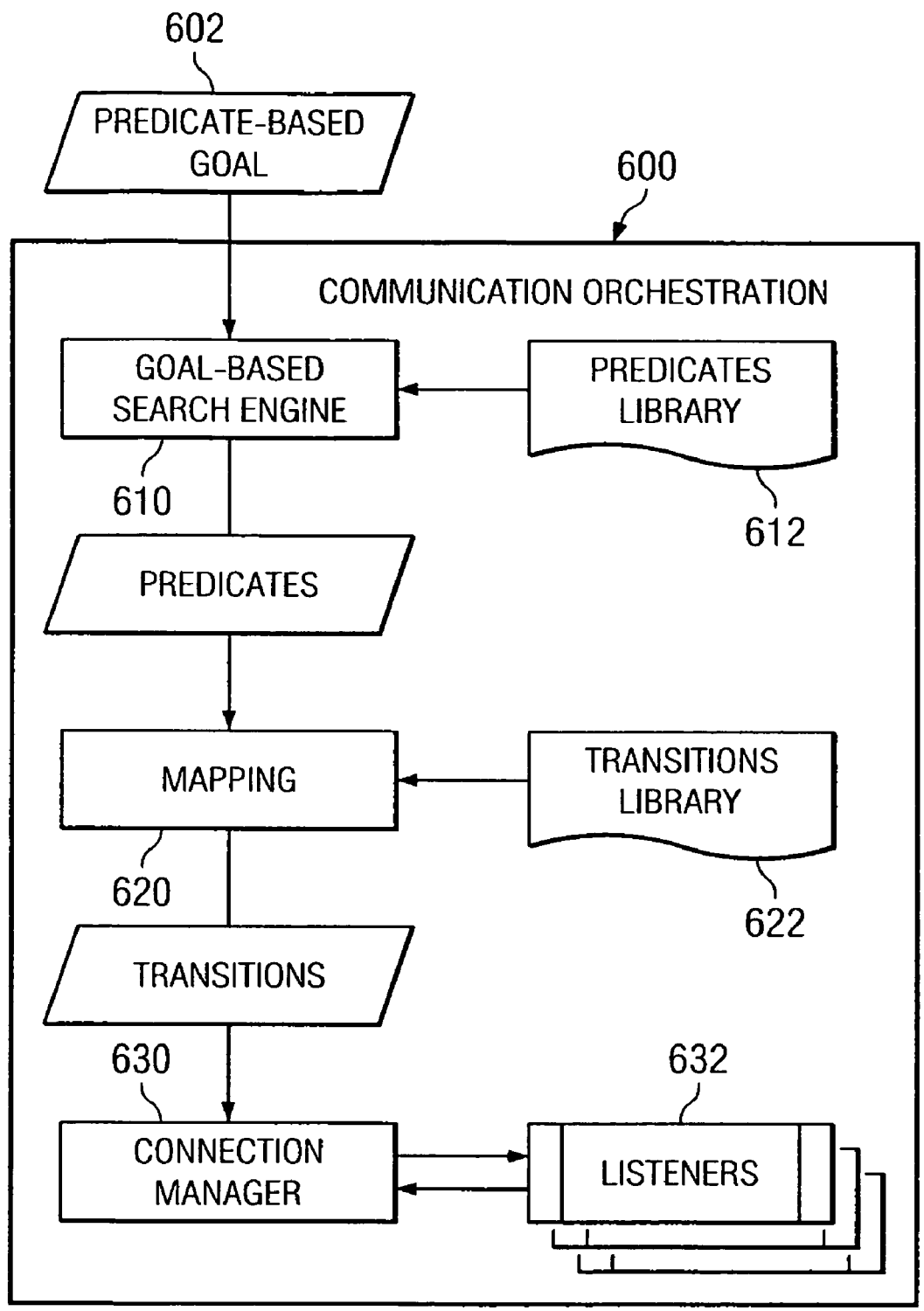
FIG. 6 is a block diagram depicting a communication orchestration service in accordance with exemplary aspects of the present invention.

FIG. 6 is a block diagram depicting a communication orchestration service in accordance with exemplary aspects of the present invention. Communication orchestration service 600 includes goal-based search engine 610, mapping component 620, and connection manager 630. A set of discrete SIP application framework transitions, along with their pre- and post-conditions, corresponding to useful building block events are built to form transitions library 622. Such transitions may consist of telephony tasks like calling a user, ending a call with a user, allocating resources for a voice conference, negotiating a common set of media types, performing text-to-speech translation, waiting until another user becomes available, etc.

Additionally, each of the transitions' pre- and post-conditions use the SIP OPTIONS command or presence information to determine, in real time, if a pre- or post-condition were to be invoked whether it would succeed. As an example, the precondition for calling a user would require that a SIP OPTIONS request to the user's phone respond with "200 OK," indicating that the user is currently able to answer a call.

In the event that a precondition fails, the transition's pre- and post-conditions may provide listeners 632, which monitor the user's device and indicate when the conditions succeed. Continuing the above example, if calling a user precondition fails because the user is busy, the precondition could provide a listener, within listeners 632, which would fire when the user's device is available.

A parallel library of discrete goal-based search predicates is built to form predicates library 612. These predicates have a one-to-one mapping with transitions library 622 and do not need to address the above-mentioned optional SIP OPTIONS or listener functionality. For instance, a predicate may correspond to calling a user, and allocating resources for a voice conference, etc.

Increasing the number of transition handlers in transitions library 622 results in greater coverage of the SIP-related signaling that may be done in the communications system. Increased coverage by transitions library 622 provides support for a greater number of predicates in predicates library 612, which allows for more expressive and more flexible goals.

In addition, predicates that represent higher level "meta" tasks and goals are defined. One example is that "contacting" someone could be satisfied by a voice connection, a text/chat connection, a combination of the two, or perhaps some other connection or combination. As another example, if user A has a voice-only device and user B has a text-only device, then user A "contacting" user B requires that a two-way text-to-speech and speech-to-text gateway must be provisioned, and that user A and user B must each send his or her data through the gateway. At the highest level would be general predicates suitable for discussing goals like "I need to get both Frank and Bob on the phone at the same time."

A user provides predicate-based goal 602 to goal-based search engine 610 in communication orchestration service 600. Goal-based search engine 610 uses a declarative, relational programming language. A declarative language is used to describe problems using facts and rules. Facts state properties that are true of the system. Rules provide ways of deducing new facts from existing facts. Because it gives information about a system, a declarative program is often called a knowledge base. Therefore, one does not "run a program"; instead, one queries the knowledge base. Prolog is a standardized declarative programming language that may be used by goal-based search engine 610.

In the depicted example, predicate-based goal 602 states a problem and goal-based search engine 610 provides predicates from predicates library 612 that solve the problem. Goal-based search engine 610 attempts to combine the predicates from predicates library 612 such that they satisfy goal 602. An intermediate/end result is a set of feasible predicates that achieve goal 602. These predicates are supplied to mapping component 620.

Mapping component 620 maps the predicates into the corresponding sequence of transitions from transitions library 622. Since the transitions have pre- and post-conditions, which operate via the SIP OPTIONS request, it is possible to determine if the possible solutions will succeed if executed. Connection manager 630 receives the sequence of transitions and issues the SIP OPTIONS requests to determine if a given solution would be successful. If a given solution succeeds, connection manager 630 runs the transitions to connect the appropriate parties into the dynamic multiple media, multiple user collaboration/communications scenario.

The SIP OPTIONS requests and the precondition handlers may indicate that connection manager 630 cannot satisfy the transitions given the current SIP telephony network and available devices. If the given solution is not successful, goal-based search engine 610 may provide more potential solutions as sets of predicates.

In the event that the search terminates and none of the possible solutions can succeed, connection manager 630 may examine available precondition listeners 632 for each possible solution. The critical sequence of precondition listeners that must fire before one of the unsuccessful solutions can become viable may be determined for each possible solution. Listeners 632 wait to be triggered by the appropriate SIP telephone events, such as a user becoming available, a user registering a phone, a media server having a free connection, etc. After the first complete critical sequence of preconditions occurs, connection manager 630 checks the preconditions via SIP OPTIONS and executes the solution.

Figure 7:
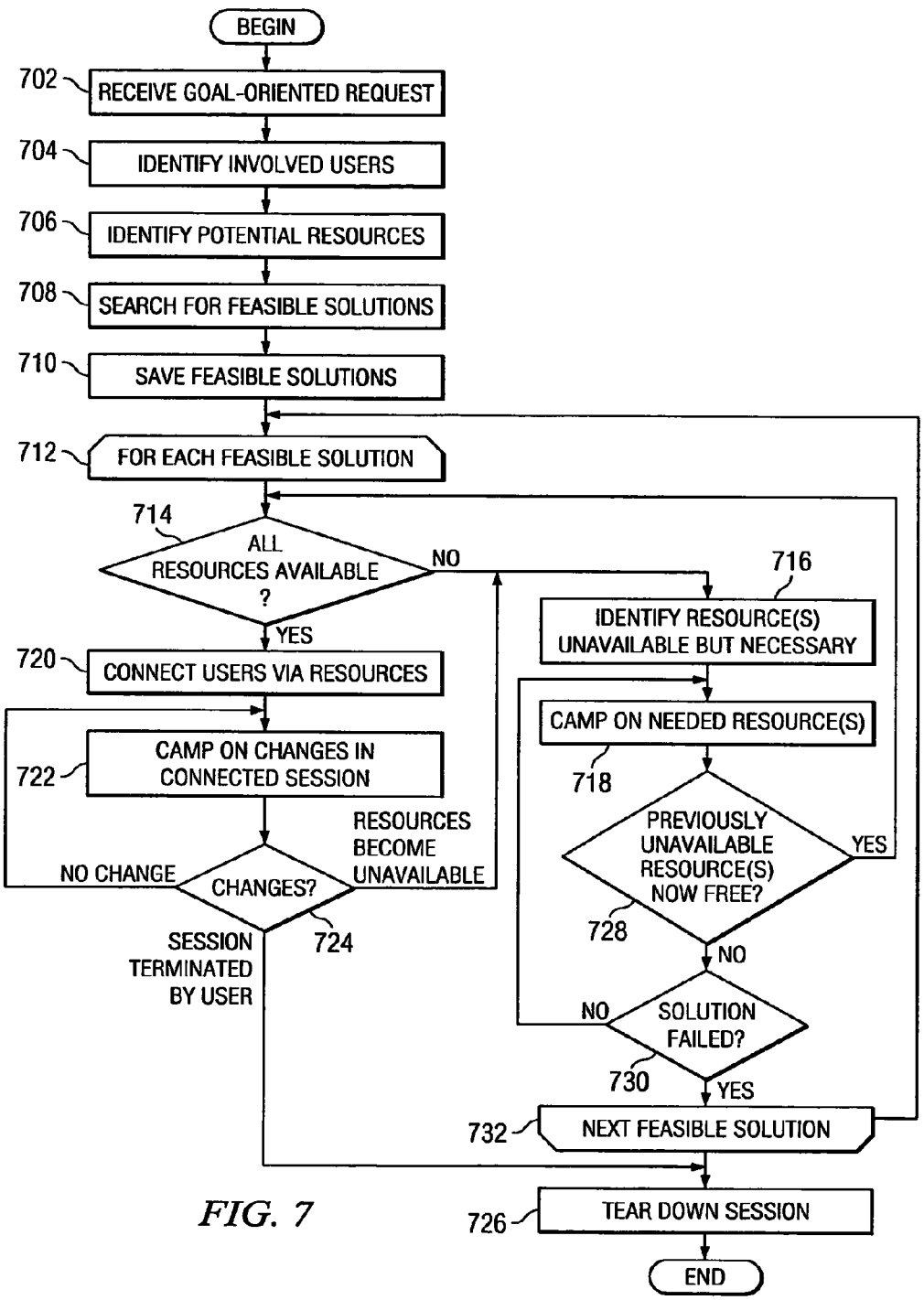
FIG. 7 is a flowchart illustrating operation of automatic orchestration of dynamic multiple party, multiple media communications in accordance with exemplary aspects of the present invention.

FIG. 7 is a flowchart illustrating operation of automatic orchestration of dynamic multiple party, multiple media communications in accordance with exemplary aspects of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage, or transmission medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and computer usable program code for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With particular reference to FIG. 7, operation of automatic orchestration of dynamic multiple party, multiple media communications is shown. Operation begins and the communication orchestration service receives a goal-oriented request (block 702). The communication orchestration service identifies involved users (block 704) and identifies potential resources (block 706). Identification of a user may comprise identifying a SIP address of record for the user. Identifying potential resources may comprise looking up SIP registered devices for each user, determining capabilities of those devices via the OPTIONS request, and determining available conferencing resources. The communication orchestration service may also determine available media conversion resources.

Thereafter, the communication orchestration service searches for feasible solutions (block 708) and saves the feasible solutions (block 710). The communication orchestration service searches for feasible solutions using the goal-oriented request, the users, and the potential devices within a predicate-based search system. The result of the search may comprise a set of predicates that represents ways to connect the above in a way that allows all involved users to communicate. The search does not take into account currently availability of any devices or services. Rather, the search finds, given ready access to all elements, what SIP topology would solve the problem. The feasible solutions may be saved in a queue with ordering based on complexity or cost, for example.

For each feasible solution (block 712), the communication orchestration service determines whether all resources are available currently (block 714). Using the SIP OPTIONS request, possibly combined with load querying hooks into the conferencing system, for example, the communication orchestration service determines the current state of the devices. This may include, for example, which users are signed on, which devices are busy, whether using a conferencing bridge at the current hour of the day is within a cost policy, and so forth.

If all resources are not available currently, the communication orchestration service identifies the resource(s) that are unavailable but necessary, in other words, what resource states prevent the solution from being immediately successful (block 716). The communication orchestration service then camps on the needed resource(s) (block 718). Using SIP SIMPLE's SUBSCRIBE/NOTIFY system, the communication orchestration service may SUBSCRIBE to the status of the resources, for instance. When the resource status changes, a SIP presence server will NOTIFY the communication orchestration service asynchronously. This subscription may apply only to a particular solution.

Returning to block 714, if all resources are currently available, the communication orchestration service connects users via the resources (block 720). In one illustrative embodiment, particular SIP endpoints may be connected by back-to-back user agents (B2BUAs). B2BUAs allow the system to set up/tear down call legs as needed. B2BUAs also allow the system to monitor call status and to perform traditional conference moderator functions, such as expelling someone from a call, giving control of a whiteboard to a particular user, and the like.

Thereafter, the communication orchestration service camps on changes in the connected session (block 722). The communication orchestration service monitors the session in progress and may take action on events within the session. The communication orchestration service determines whether changes occur in the connected session (block 724). If there is no change, operation returns to block 722 to camp on changes in the connected session. Two changes are shown here, but others may be useful and will be readily apparent. As a particular example, all users may REGISTER video conferencing capabilities or shared whiteboard functionality.

In the depicted example, if resources become available in block 724, operation proceeds to block 716 to identify resource(s) that are unavailable, but necessary, as described above. For instance, perhaps a conference bridge goes down, part of the network becomes unavailable, or a participant's computer freezes. The communication orchestration service returns to the queue of feasible solutions and either waits for resources to become available or tries to select a new solution that accomplishes the same goal with different resources.

If the session is terminated by the user in block 724, the communication orchestration service tears down the session (block 726) and operation ends. The communication orchestration service tears down all session legs and frees the services and conversion resources in use.

Returning to block 718, when the communication orchestration service camps on needed resource(s), the communication orchestration service determines whether previously unavailable resource(s) are now available (block 728). On receipt of a NOTIFY event, for example, the particular solution may be "reawakened" and re-checked for immediate availability. This notification is especially useful if no feasible solution can be executed currently. A user may wish to have a multiple party call started as soon as it is possible to include all participants, for example. If previously unavailable resource(s) are now available, operation returns to block 714 to determine whether all resources are now available.

If previously unavailable resource(s) are not available in block 728, the communication orchestration service determines if the current solution failed (block 730). If the communication orchestration service determines that the current solution has not failed in block 730, operation returns to block 718 to camp on need resource(s).

If the current solution failed in block 730, the communication orchestration service returns to the queue of feasible solutions and considers the next feasible solution (block 732). Thereafter, operation returns to block 712 for the next feasible solution. If, however, all feasible solutions have been exhausted and there are no solutions to consider in block 732, operation proceeds to block 726 to tear down the session and then operation ends.

Failure of a solution shall not be limited to a solution being impossible. The communication orchestration service may camp on needed resources for a predetermined period of time, for example. The communication orchestration service may determine that a solution has failed in block 730 and proceed to block 732 to consider the next feasible solution in parallel with camping on need resources (block 718) for the current solution. In this manner, the communication orchestration service may try a plurality of solutions in parallel until a solution succeeds.

Thus, the exemplary aspects of the present invention solve the disadvantages of the prior art by providing a communication orchestration service that automatically orchestrates dynamic multiple party, multiple media communications. A customer expresses his or her communications needs in the form of a high-level goal or goals. A goal-based search finds a combination of building block predicates that can be used to satisfy the customer's needs. In conjunction with the search process, the mechanism uses the SIP OPTIONS request to actively query device status and capabilities during the search. This enables the search to actively explore the communications environment at runtime. Once a solution is found, the necessary parties can be contacted, resources can be provisioned, and the multiple media, multiple user collaboration/conference can be initiated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, or communicate the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of automatic orchestration of a dynamic multiple party, multiple media communications session in a communications network, the computer implemented method comprising:

creating a library of telephony tasks in a communication orchestration service of telephony tasks that specify transitions in a network, wherein the transitions comprise state changes in sets of data;

establishing, in the communication orchestration service, a set of predicates that correspond to each transition in the library of telephony tasks, wherein predicates within the set of predicates comprise discrete Session Initiated Protocol communications paradigms;

receiving, by the communication orchestration service from a user using a first computer system, a high-level goal that states a problem of a communications session, wherein the communication orchestration service exists entirely outside of the first computer system;

identifying, by the communication orchestration service, involved users for the communications session based on the goal, wherein the involved users use a plurality of additional computer systems, and wherein the communication orchestration service exists entirely outside of the plurality of additional computer systems;

identifying, by the communication orchestration service, potential resources for the communications session based on the goal;

wherein identifying potential resources includes:

looking up a plurality of devices for involved users, wherein the plurality of devices are session initiated protocol registered devices;

determining capabilities of the plurality of devices including determining which at least one of a plurality of media types is used by each one of the devices, wherein at least two of the plurality of devices use different ones of the plurality of media types simultaneously, and wherein the user using the first computer system uses only text communication and a user using one of the plurality of additional computer systems uses only voice communication; and determining available media conversion services in the communications network for converting text communications into voice communications and voice communications into text communications, wherein the user using the first computer system communicates with a second user using only text and the second user communicates with the user using the first computer system using only speech; and searching, by the communication orchestration service based on the goal, the set of predicates, the capabilities of the session initiation protocol registered devices, and available media conversion services, for one or more solutions that satisfy the goal.

2. The computer implemented method of claim 1, wherein identifying involved users comprises identifying a session initiation protocol address of record for each involved user.

3. The computer implemented method of claim 1, wherein the searching comprises:

searching the set of predicates to identify a combination of predicates that satisfies the goal; and mapping the combination of predicates to the library of telephony tasks, wherein the library comprises sets of session initiation protocol application framework transitions.

4. The computer implemented method of claim 3, wherein the library further comprises preconditions that are examined to determine whether they are satisfied.

5. The computer implemented method of claim 1, further comprising:
   storing the existing solutions in a queue in an order based on one of complexity and cost.

6. The computer implemented method of claim 5 further comprising:
   determining whether resources are available for an existing solution; and
   responsive to resources not being available, considering another existing solution from the queue.

7. The computer implemented method of claim 6, further comprising:
   determining whether resources are available for an existing solution in parallel with determining whether a previously unavailable resource is currently available.

8. The computer implemented method of claim 6, further comprising:
   responsive to a needed resource that is available for an existing solution becoming unavailable, waiting for the needed resource to become available; and
   responsive to the needed resource becoming available, executing the existing solution to continue the communications session.

9. The computer implemented method of claim 1 further comprising:
   responsive to finding the one or more solutions, initiating the communications session using a selected solution.

10. An apparatus that automatically orchestrates dynamic multiple party, multiple media communications in a communications network, the apparatus comprising:
    a processor;
    a memory communicatively coupled to the processor, wherein the memory stores instructions including:
    creating a library of telephony tasks in a communication orchestration service of telephony tasks that specify transitions in a network, wherein the transitions comprise state changes in sets of data;
    establishing, in the communication orchestration service, a set of predicates that correspond to each transition in the library of telephony tasks, wherein predicates within the set of predicates comprise discrete Session Initiated Protocol communications paradigms;
    receiving, by the communication orchestration service from a user using a first computer system, a high-level goal that states a problem of a communications session, wherein the communication orchestration service exists entirely outside of the first computer system;
    identifying, by the communication orchestration service, involved users for the communications session based on the goal, wherein the involved users use a plurality of additional computer systems, and wherein the communication orchestration service exists entirely outside of the plurality of additional computer systems;
    identifying, by the communication orchestration service, potential resources for the communications session based on the goal;
    wherein identifying potential resources includes:
        looking up a plurality of devices for involved users, wherein the plurality of devices are session initiated protocol registered devices;
        determining capabilities of the plurality of devices including determining which at least one of a plurality of media types is used by each one of the devices, wherein at least two of the plurality of devices use different ones of the plurality of media types simultaneously, and wherein the user using the first computer system uses only text communication and a user using one of the plurality of additional computer systems uses only voice communication; and
        determining available media conversion services in the communications network for converting text communications into voice communications and voice communications into text communications, wherein the user using the first computer system communicates with a second user using only text and the second user communicates with the user using the first computer system using only speech; and
    searching, by the communication orchestration service based on the goal, the set of predicates, the capabilities of the session initiation protocol registered devices, and available media conversion services, for one or more solutions that satisfy the goal.

11. The apparatus of claim 10, wherein the memory stores instructions comprising:
    responsive to finding the one or more solutions, initiating the communications session using a selected solution.

12. A computer program product comprising a computer usable medium having computer usable program code embodied therein, which when executed by a processor, automatically orchestrates dynamic multiple party, multiple media communications in a communication network, the computer program product comprising:
    computer usable program code configured to create a library of telephony tasks in a communication orchestration service of telephony tasks that specify transitions in a network, wherein the transitions comprise state changes in sets of data;
    computer usable program code configured to establish, in the communication orchestration service, a set of predicates that correspond to each transition in the library of telephony tasks, wherein predicates within the set of predicates comprise discrete Session Initiated Protocol communications paradigms;
    computer usable program code configured to receive, by the communication orchestration service from a user using a first computer system, a high-level goal that states a problem of a communications session, wherein the communication orchestration service exists entirely outside of the first computer system;
    computer usable program code configured to identify, by the communication orchestration service, involved users for the communications session based on the goal, wherein the involved users use a plurality of additional computer systems, and wherein the communication orchestration service exists entirely outside of the plurality of additional computer systems;
    computer usable program code configured to identify, by the communication orchestration service, potential resources for the communications session based on the goal;
    wherein the computer usable program code configured to identify potential resources includes:
        computer usable program code configured to look up a plurality of devices for involved users, wherein the plurality of devices are session initiated protocol registered devices;

computer usable program code configured to determine capabilities of the plurality of devices including determining which at least one of a plurality of media types is used by each one of the devices, wherein at least two of the plurality of devices use different ones of the plurality of media types simultaneously, and wherein the user using the first computer system uses only text communication and a user using one of the plurality of additional computer systems uses only voice communication; and computer usable program code configured to determine available media conversion services in the communications network for converting text communications into voice communications and voice communications into text communications, wherein the user using the first computer system communicates with a second user using only text and the second user communicates with the user using the first computer system using only speech; and computer usable program code configured to search, by the communication orchestration service based on the goal, the set of predicates, the capabilities of the session initiation protocol registered devices, and available media conversion services, for one or more solutions that satisfy the goal.

13. The computer program product of claim 12 further comprising:
responsive to finding the one or more solutions, computer usable program code configured to initiate the communications session using a selected solution.

14. The computer program product of claim 12, wherein the computer usable program code configured to identify involved users comprises computer usable program code configured to identify a session initiation protocol address of record for each involved user.

15. The computer program product of claim 12, wherein the computer usable program code configured to search comprises:

computer usable program code configured to search the set of predicates to identify a combination of predicates that satisfies the goal; and computer usable program code configured to map the combination of predicates to the library of telephony tasks, wherein the library comprises sets of session initiation protocol application framework transitions.

16. The computer program product of claim 15, wherein the library further comprises preconditions that are examined to determine whether they are satisfied.

17. The computer program product of claim 12, further comprising:
computer usable program code configured to store the existing solutions in a queue in an order based on one of complexity and cost.

18. The computer program product of claim 17 further comprising:
computer usable program code configured to determine whether resources are available for an existing solution; and
responsive to resources not being available, computer usable program code configured to consider another existing solution from the queue.

19. The computer program product of claim 18, further comprising:
computer usable program code configured to determine whether resources are available for an existing solution in parallel with determining whether a previously unavailable resource is currently available.

20. The computer program product of claim 18, further comprising:
responsive to a needed resource that is available for an existing solution becoming unavailable, computer usable program code configured to wait for the needed resource to become available; and
responsive to the needed resource becoming available, computer usable program code configured to execute the existing solution to continue the communications session.

* * * * *